US012617025B2

(12) United States Patent
Shuto et al.

(10) Patent No.: US 12,617,025 B2
(45) Date of Patent: May 5, 2026

(54) HOLDER, CUTTING TOOL, AND METHOD FOR MANUFACTURING MACHINED PRODUCT

(71) Applicant: KYOCERA CORPORATION, Kyoto (JP)

(72) Inventors: Tomohito Shuto, Kyoto (JP); Yoshihito Ikeda, Kyoto (JP); Hirotoshi Gonzui, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 435 days.

(21) Appl. No.: 18/557,048

(22) PCT Filed: Apr. 7, 2022

(86) PCT No.: PCT/JP2022/017229
§ 371 (c)(1),
(2) Date: Oct. 25, 2023

(87) PCT Pub. No.: WO2022/234754
PCT Pub. Date: Nov. 10, 2022

(65) Prior Publication Data
US 2024/0217005 A1     Jul. 4, 2024

(30) Foreign Application Priority Data

May 7, 2021     (JP) ................................. 2021-079248

(51) Int. Cl.
B23B 29/02          (2006.01)
B23B 27/00          (2006.01)
B23B 29/04          (2006.01)
(52) U.S. Cl.
CPC .......... B23B 29/025 (2013.01); B23B 27/002 (2013.01); B23B 29/043 (2013.01)

(58) Field of Classification Search
CPC . B23B 29/022; B23B 2250/16; B23B 29/025; B23B 27/002; B23B 29/043;
(Continued)

(56) References Cited

U.S. PATENT DOCUMENTS 3,774,730 A * 11/1973 Maddux ................ B23B 29/022
188/379
3,938,626 A * 2/1976 Hopkins .................... F16F 7/10
408/143
(Continued)

FOREIGN PATENT DOCUMENTS

JP       2006305674 A * 11/2006 ........... B23B 29/022
RU         2556369 C2 * 7/2015 .......... F16F 15/1435
WO       2020049167 A1   3/2020

OTHER PUBLICATIONS

English Machine Translation of RU_2556369_C2 (Year: 2015).*
English Machine Translation of JP_2006305674_A (Year: 2006).*

*Primary Examiner* — Sarang Afzali
(74) *Attorney, Agent, or Firm* — HAUPTMAN HAM, LLP

(57)          ABSTRACT
The holder includes a body having a rod shape extending from a first end surface to a second end surface and including a large-diameter portion which is a recess extending from the first end surface, a weight located in the large-diameter portion, a ring-shaped first elastic member, and a lid press-fitted into the large-diameter portion from the side of the first end surface. The inner peripheral surface of the large-diameter portion includes a first region located on the side of the first end surface and a second region located closer to the second end surface than the first region. The first elastic member comes into contact with the inner peripheral surface of the large-diameter portion in the second region to fix the weight to the inner peripheral surface.

(Continued)

The surface roughness of the second region is greater than the surface roughness of the first region.

8 Claims, 7 Drawing Sheets

(58) Field of Classification Search
CPC ..... B23B 29/04; B23C 5/003; B23C 2226/33;
F16F 7/108
See application file for complete search history.

(56) References Cited

U.S. PATENT DOCUMENTS

| | | | | |
|---|---|---|---|---|
| 5,413,318 | A * | 5/1995 | Andreassen ............ | F16F 7/108 |
| | | | | 267/140 |
| 11,583,937 | B2 * | 2/2023 | Jensvold ............... | B23B 29/022 |
| 12,442,428 | B2 * | 10/2025 | Fu ...................... | B23Q 11/0032 |
| 2003/0147707 | A1 * | 8/2003 | Perkowski ................ | F16F 7/10 |
| | | | | 407/30 |
| 2010/0242696 | A1 * | 9/2010 | Digernes ............... | F16F 7/1028 |
| | | | | 83/169 |
| 2013/0206525 | A1 * | 8/2013 | Ogata ....................... | F16F 7/08 |
| | | | | 188/381 |
| 2016/0311031 | A1 * | 10/2016 | Giannetti ............. | B23B 29/022 |

* cited by examiner

HOLDER, CUTTING TOOL, AND METHOD FOR MANUFACTURING MACHINED PRODUCT

CROSS-REFERENCE TO RELATED APPLICATIONS

This application is national stage application of International Application No. PCT/JP2022/017229, filed on Apr. 7, 2022, which claims priority to Japanese Patent Application No. 2021-079248, filed on May 7, 2021.

TECHNICAL FIELD

The present disclosure relates to a holder for a cutting tool used when machining workpieces such as those made of metal, a cutting tool, and a method for manufacturing a machined product.

BACKGROUND OF INVENTION

For example, a cutting tool described in Patent Document 1 is known as a cutting tool used when machining workpieces such as those made of metal. The cutting tool described in Patent Document 1 includes a holder and a cutting insert. The holder includes a stem including a cavity, a weight that is a damping member inserted into the cavity, an O-ring positioned between the stem and the weight, and a head that closes an inlet of the cavity.

A cutting insert including a cutting edge is mounted on a distal end portion of the head. When a protrusion amount L of a distal end portion of the cutting edge from an end surface of the stem is increased with respect to a diameter D of the stem, vibration of the stem in a radial direction is easily generated in the holder, and machining accuracy deteriorates, since the rigidity of the stem made of steel is low. The vibration of the holder can be reduced by accommodating a weight having a natural frequency different from that of the stem in the stem and vibrating the stem and the weight at different frequencies.

CITATION LIST

Patent Literature

Patent Document 1: WO2020/049167

SUMMARY

A holder according to a non-limiting example of the present disclosure includes: a body having a bar shape extending along a center axis from a first end surface to a second end surface, the body including a recessed portion extending from the first end surface toward the second end surface; a weight located in the recessed portion; an elastic member having a ring shape in contact with an inner peripheral surface of the recessed portion; and a lid press-fitted to the recessed portion from a side of the first end surface. The inner peripheral surface of the recessed portion includes: a first region located on a side of the first end surface and with which the lid can come into contact; and a second region located closer to the second end surface than the first region and with which the elastic member can come into contact. The elastic member comes into contact with the inner peripheral surface in the second region and fixes the weight to the inner peripheral surface. A surface roughness of the second region is greater than a surface roughness of the first region.

DESCRIPTION OF EMBODIMENTS

Figure 1:
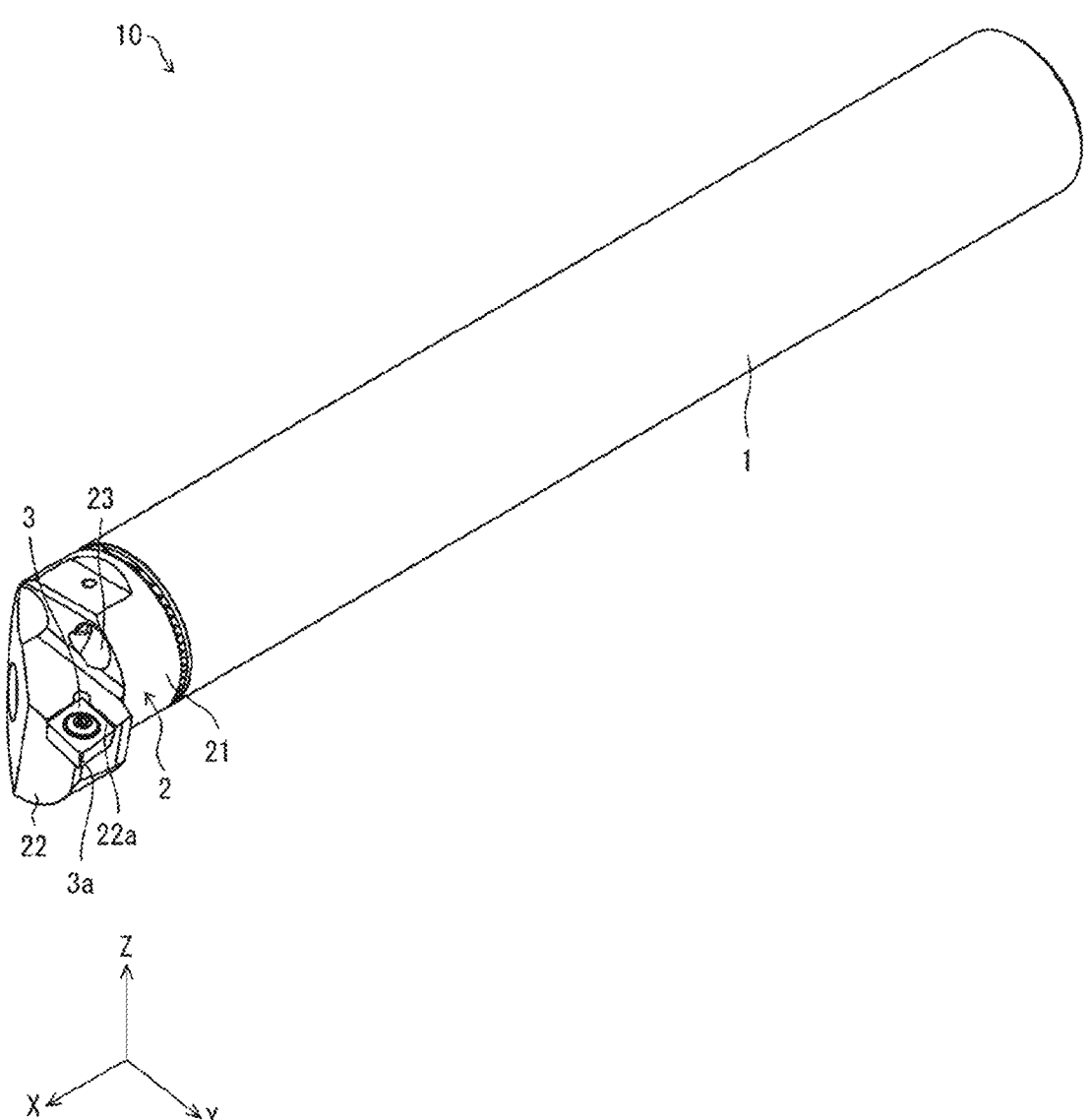
FIG. 1 is a perspective view illustrating a cutting tool of a non-limiting embodiment of the present disclosure.

Detailed description will be given below of the holder, the cutting tool, and the method for manufacturing a machined product of an embodiment that is an example of the present disclosure with reference to the diagrams. However, each of the figures, which will be referred to below, is a simplified representation of only main members necessary for description of the embodiments. Thus, the holder and the cutting tool may include any constituent member not illustrated in each of the figures referenced. The dimensions of the members in the drawings do not faithfully represent the actual dimensions of the constituent members, the dimension ratios of the members, or the like.

Cutting Tool

Figure 2:
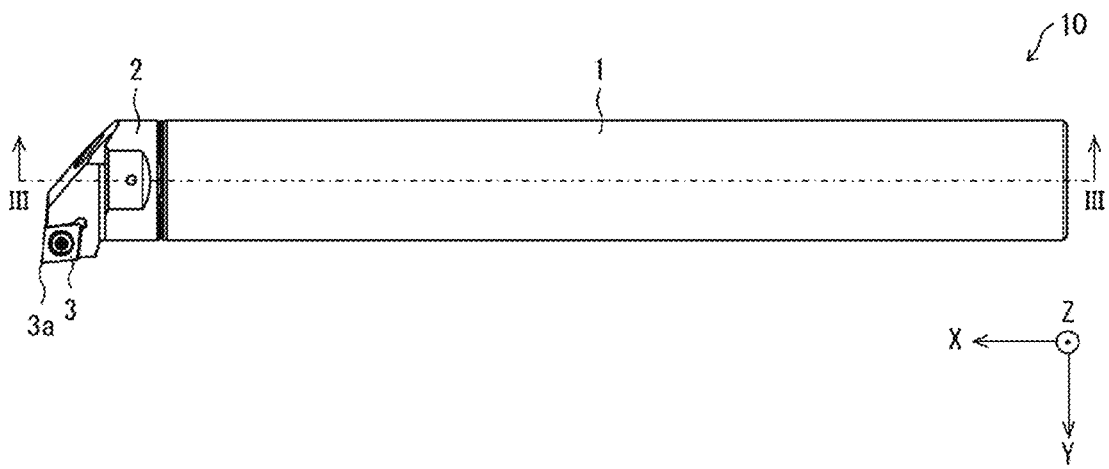
FIG. 2 is a plan view of the cutting tool illustrated in FIG. 1.

FIG. 1 is a perspective view illustrating a cutting tool 10 according to a first embodiment. FIG. 2 is a plan view illustrating the cutting tool 10. The cutting tool 10 is a tool in which a head 2 is mounted to a distal end side of a round bar-shaped holder 1 extending in an X-axis direction in FIG. 1. A cutting insert (hereinafter referred to as an insert) 3 is mounted on the head 2.

The cutting tool 10 is, for example, a turning tool, and specific examples thereof include a tool for external turning, a tool for boring, a tool for groove-forming, and a tool for cutting-off. The cutting tool 10 may be a rotating tool in which the tool side rotates. In the following description, a side of the cutting tool 10 where the head 2 is located is referred to as a distal end side, and a side opposite to the distal end side is referred to as a rear end side.

Holder

Figure 3:
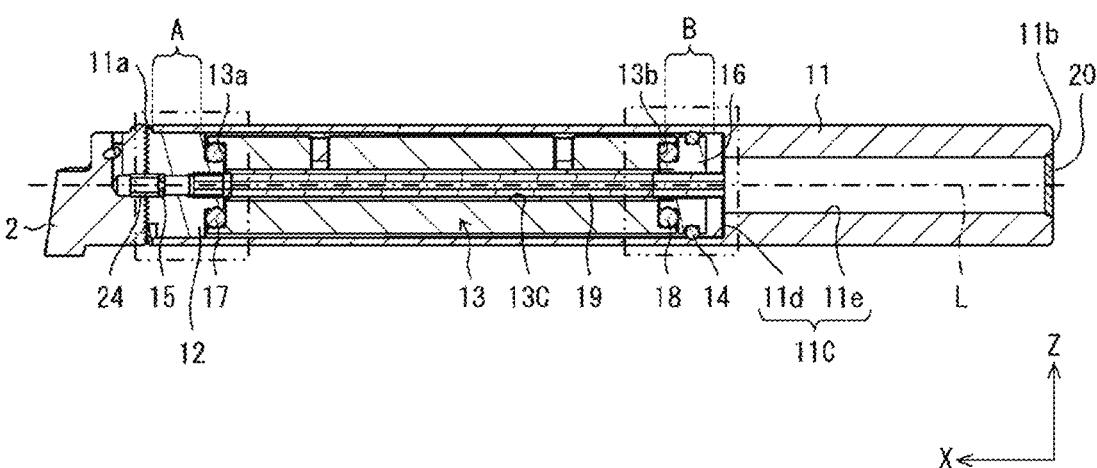
FIG. 3 is a cross-sectional view taken along line III-III indicated by arrows in FIG. 2.
Figure 4:
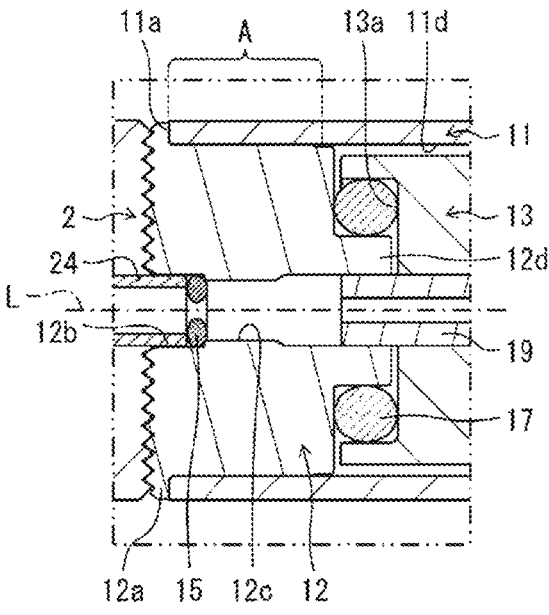
FIG. 4 is an enlarged view of a first end surface side in FIG. 3.
Figure 5:
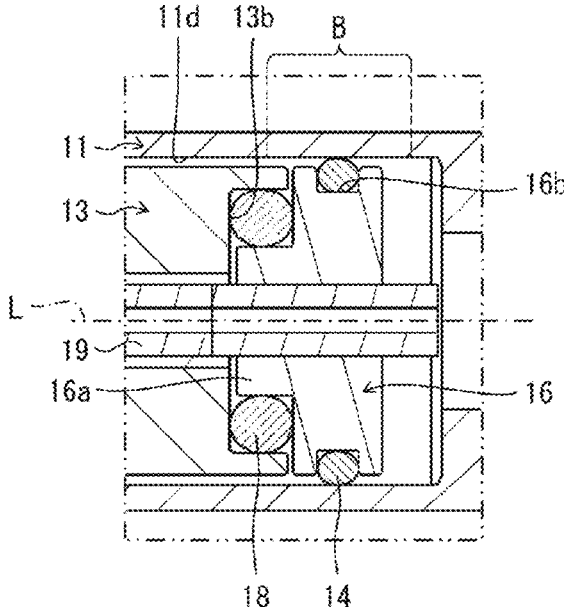
FIG. 5 is an enlarged view of a second end surface side in FIG. 3.

FIG. 3 is a cross-sectional view taken along line III-III indicated by arrows in FIG. 2. FIG. 4 is an enlarged view of the first end surface side in FIG. 3. FIG. 5 is an enlarged view of the second end surface side in FIG. 3.

As illustrated in FIG. 3, the holder 1 of the cutting tool 10 includes a body 11, a lid 12, a first elastic member 14, and a fixing member 16. Examples of the material of the holder 1 include steel such as stainless steel, cast iron, and an aluminum alloy. In particular, when steel is used among these materials, the toughness of the holder 1 can be increased. Hereinafter, each member will be described in detail.

The external appearance of the body 11 may be a round bar shape extending in the X-axis direction, and each of a first end surface 11a on the head 2 side and a second end surface 11b on the rear end side may have a structure in which a center portion is open. The body 11 includes therein a through hole 11c extending along a center axis (axis center) L of the holder 1 (in the X-axis direction) from the first end surface 11a toward the second end surface 11b.

The through hole 11c includes a large-diameter portion 11d located on the first end surface 11a side, and a small-diameter portion 11e continuous with the large-diameter portion 11d and extending toward the second end surface 11b. The large-diameter portion 11d corresponds to a recessed portion extending from the first end surface 11a toward the second end surface 11b. The through hole 11c is provided by boring a columnar base member made of the above-described material.

An inner diameter of the small-diameter portion 11e is smaller than an inner diameter of the large-diameter portion 11d. Each of the large-diameter portion 11d and the small-diameter portion 11e has a cylindrical shape, and the large-diameter portion 11d is thinner than the small-diameter portion 11e. In FIG. 2, the large-diameter portion 11d has a length of about two-thirds of the length of the holder 1, and the small-diameter portion 11e has a length of about one third of the length of the holder 1, but the ratio of the lengths of the large-diameter portion 11d and the small-diameter portion 11e is not limited to this case.

The lid 12, the weight 13, the first elastic member 14, and the fixing member 16 are accommodated in the large-diameter portion 11d.

The lid 12 is press-fitted into the large-diameter portion 11d from the first end surface 11a of the body 11 to close an opening formed in the first end surface 11a. Examples of the material of the lid 12 include steel, cast iron, and an aluminum alloy. As illustrated in FIG. 4, the lid 12 has a substantially cylindrical shape including a first hole 12c, and is press-fitted into the large-diameter portion 11d with its axis center aligned with a center axis L. The lid 12 includes a flange portion 12a, a recessed portion 12b, the first hole 12c, and a protruding portion 12d.

The flange portion 12a is provided on an outer peripheral portion on the distal end side of the lid 12 so as to protrude outward in the radial direction. When the flange portion 12a abuts against the first end surface 11a, the lid 12 is restricted from entering the inside of the body 11. The end surface of the lid 12 facing the head 2 is provided with a serration. The recessed portion 12b is provided in a round hole shape from a center portion of the end surface of the lid 12 facing the head 2 toward the rear end side. A protruding portion 24, which is tubular, of the head 2, which will be described later, is inserted into the recessed portion 12b.

A ring-shaped second elastic member 15 is interposed between the recessed portion 12b and the protruding portion 24. The second elastic member 15 is, for example, an O-ring or a spring, and examples of the material thereof include rubber such as acrylonitrile butadiene rubber (NBR) and polyester urethane rubber (AU), and synthetic resin. The protruding portion 24 is brought into close contact with the recessed portion 12b through the second elastic member 15. The protruding portion 12d is provided so as to protrude from the end surface on the rear end side of the lid 12 toward the rear end, and has a cylindrical shape with the center axis L as a center axis. The first hole 12c extends from the recessed portion 12b toward the second end surface 11b side and passes through the protruding portion 12d with its axis center aligned with the center axis L.

Returning to FIG. 3, the weight 13 is accommodated in the body 11 in order to reduce vibration of the holder 1 generated along the radial direction of the holder 1. The weight 13 is a damping member. The weight 13 has a substantially cylindrical shape including a second hole 13c, and is disposed in the large-diameter portion 11d so as to be adjacent to the lid 12 with its axis center aligned with the center axis L. The weight 13 is accommodated in the large-diameter portion 11d with a slight gap between the weight 13 and an inner peripheral surface of the large-diameter portion 11d.

Examples of the material of the weight 13 include high-rigidity materials such as high-speed steel, cemented carbide alloy, and cermet. The composition of the cemented carbide alloy includes WC—Co, WC—TiC—Co, and WC—TiC—TaC—Co, for example. WC—Co is produced by adding a cobalt (Co) powder to tungsten carbide (WC) and sintering this mixture. WC—TiC—Co is formed by adding titanium carbide (TIC) to WC—Co. WC—TiC—TaC—Co is formed by adding tantalum carbide (TaC) to WC—TiC—Co.

Cermet is a sintered composite material in which a metal is combined with a ceramic component. Specifically, examples of the cermet include compounds in which a titanium compound such as titanium carbide (TiC) or titanium nitride (TiN) is the primary component.

The weight 13 includes a recessed portion 13a, a recessed portion 13b, and a second hole 13c. The recessed portion 13a is provided in a round hole shape at the center portion of the end surface on the distal end side of the weight 13. The recessed portion 13b is provided in a round hole shape at the center portion of the end surface on the rear end side of the weight 13. The second hole 13c is provided so as to enable the recessed portion 13a and the recessed portion 13b to communicate with each other. A flow pipe 19 through which coolant flows is inserted into the second hole 13c.

Examples of the material of the flow pipe 19 include metal and resin. Examples of the metal include copper, steel, stainless steel, and aluminum. Examples of the resin include polyethylene, polypropylene, polystyrene, and polyvinyl-chloride. Examples of the coolant include water-insoluble oil agents such as oil-based, inert extreme-pressure, and active extreme-pressure cutting oils, and water-soluble oil agents such as emulsion-based, solution-based, and solution-based cutting oils.

As illustrated in FIG. 5, the fixing member 16 is disposed on the rear end side of the weight 13 in the large-diameter portion 11d of the through hole 11c. The fixing member 16 fixes the weight 13 to the inner peripheral surface of the large-diameter portion 11d via the first elastic member 14. The fixing member 16 has a substantially cylindrical shape including a hollow portion into which the flow pipe 19 is inserted, and is disposed in the large-diameter portion 11d with its axis center aligned with the center axis L.

Examples of the material of the fixing member 16 include metal and resin. Examples of the metal include copper, steel, stainless steel, and aluminum. Examples of the resin include polyethylene, polypropylene, polystyrene, and polyvinyl-chloride.

The fixing member 16 includes a protruding portion 16a and a recessed groove 16b. The protruding portion 16a is provided so as to protrude toward the weight 13 from a center portion of an end surface of the fixing member 16 facing the weight 13, and has a cylindrical shape. The recessed groove 16*b* is provided circumferentially around the outer peripheral surface of the fixing member 16 facing the inner peripheral surface of the large-diameter portion 11*d*.

The first elastic member 14 is fitted into the recessed groove 16*b* of the fixing member 16. The first elastic member 14 is, for example, an O-ring, and may be made of the same material as the second elastic member 15.

As illustrated in FIG. 4, the protruding portion 12*d* of the lid 12 is inserted into the recessed portion 13*a* of the weight 13 in a state where a ring-shaped third elastic member 17 is externally fitted. As illustrated in FIG. 5, the protruding portion 16*a* of the fixing member 16 is inserted into the recessed portion 13*b* in a state where a ring-shaped fourth elastic member 18 is externally fitted. The third elastic member 17 and the fourth elastic member 18 may be made of the same material as the second elastic member 15.

The distal end side of the weight 13 is fixed to the lid 12 by a repulsive force generated by the third elastic member 17 being pressed between the outer peripheral surface of the protruding portion 12*d* of the lid 12 and the inner peripheral surface of the recessed portion 13*a* of the weight 13 (see FIG. 4). The rear end side of the weight 13 is fixed to the fixing member 16 by the fourth elastic member 18 being pressed between the outer peripheral surface of the protruding portion 16*a* of the fixing member 16 and the recessed portion 13*b* of the weight 13 (see FIG. 5). As a result, the lid 12, the weight 13, and the fixing member 16 are integrated. As illustrated in FIG. 4, the first hole 12*c* and the second hole 13*c* are connected to each other, and the distal end portion of the flow pipe 19 enters the first hole 12*c*.

The first elastic member 14 comes into contact with the inner peripheral surface of the large-diameter portion 11*d* of the through hole 11*c*, and fixes the weight 13 integrated with the fixing member 16 to the inner peripheral surface by a repulsive force generated by being pressed. That is, the weight 13 is fixed to the body 11 by being held at both end portions by the lid 12 fixed to the body 11 by being press-fitted into the body 11 and the fixing member 16 fixed to the body 11 via the first elastic member 14.

As illustrated in FIG. 3, the diameter of the opening in the second end surface 11*b* of the body 11 is substantially equal to the diameter of the small-diameter portion 11*e*. Coolant is injected into the small-diameter portion 11*e* from the opening. The opening is closed by a plug 20. The injected coolant passes through the flow pipe 19 and is ejected from an ejection portion 23 of the head 2, which will be described later, during machining.

As illustrated in FIGS. 4 and 5, the inner peripheral surface of the large-diameter portion 11*d* of the through hole 11*c* includes a first region A located on the distal end side of the large-diameter portion 11*d* and with which the lid 12 comes into contact and a second region B located on the rear end side of the large-diameter portion 11*d* and with which the first elastic member 14 comes into contact. The surface roughness of the second region B is greater than that of the first region A. In the present embodiment, the surface roughness in the direction along the center axis L is greater in the second region B than in the first region A. Examples of the surface roughness include arithmetic average roughness (Ra) based on JIS B 0601:2001, maximum height (Rz), and ten-point average roughness ($R_{Z_{JIS}}$).

The arithmetic average roughness (Ra) is a value expressed in micrometers (μm) obtained by the following equation (1) when a roughness curve is expressed as y=f(x)

by extracting only a reference length from the roughness curve in the direction of the average line thereof, taking the X-axis in the direction of the average line of the extracted portion, and taking the Y-axis in the direction of the longitudinal multiplication factor. In the present disclosure, the average line is aligned with the center axis L.

$$Ra = 1/l \int_0^1 |f(x)| dx \qquad (1)$$

The maximum height (Rz) is obtained by extracting only a reference length from the roughness curve in the direction of the average line thereof, measuring a distance between a peak line and a valley line of the extracted portion in the direction of the longitudinal multiplication factor of the roughness curve, and expressing this value in micrometers (μm).

The ten point average roughness ($R_{Z_{JIS}}$) is obtained by obtaining the sum of the average value of the absolute values of heights (Yp) from the highest peak to the fifth peak and the average value of the absolute values of heights (Yv) from the lowest valley to the fifth valley measured in the direction of the longitudinal multiplication factor from the average line of a portion extracted from the roughness curve by a reference length in the direction of the average line thereof, and expressing the sum in micrometers (μm).

As the surface roughness increases, the degree of unevenness increases. The technique of changing the surface roughness of the inner peripheral surface of the large-diameter portion 11*d* is not limited to a specific technique. For example, the surface roughness may be changed by changing the machining conditions of the drill when forming the large-diameter portion 11*d* or changing the drill used for machining.

The large-diameter portion 11*d* is formed so that the surface roughness of the second region B is greater than that of the first region A in order to increase adhesiveness between the first elastic member 14 and the inner peripheral surface of the large-diameter portion 11*d* and reduce a position shift of the first elastic member 14. Accordingly, the degree of the unevenness is great in the second region B, whereby the first elastic member 14 is easily locked by the unevenness of the second region B, and the first elastic member 14 comes into close contact with the inner peripheral surface of the large-diameter portion 11*d* and is unlikely to move.

Therefore, the fixing member 16 can satisfactorily and firmly fix the weight 13 in the large-diameter portion 11*d* in both the direction along the center axis L (axial direction) and the direction intersecting the direction along the center axis L (radial direction). By firmly fixing the weight 13 to the inside of the body 11, the weight 13 satisfactorily absorbs vibration of the body 11 in the radial direction, and the vibration is effectively reduced.

In the present disclosure, the through hole 11*c* is formed such that the first region A into which the lid 12 is press-fitted has a smaller surface roughness than the second region B, which does not have a degree of unevenness sufficient to firmly fix the first elastic member 14, in order to facilitate press-fitting of the lid 12 and make it difficult to loosen. Accordingly, the degree of unevenness of the first region A is small and the first region A is smooth, whereby the press-fitting of the lid 12 is easy, and the press-fitted lid 12 does not rattle, comes into close contact with the inner peripheral surface of the through hole 11*c*, and is less likely to loosen.

The lid 12 includes an outer peripheral surface that can come into contact with the first region A of the large-diameter portion 11*d*, and the outer peripheral surface may have the same surface roughness as that of the first region A. In the present embodiment, the surface roughness of the outer peripheral surface may be the same as that of the first region A in the direction along the center axis L. According to the above-described configuration, the position of the lid 12 press-fitted into the large-diameter portion 11d is less likely to shift in the first region A.

The body 11 of the holder 1 includes an outer surface, and the surface roughness of the outer surface may be equal to or less than the surface roughness of the first region A. In the direction along the center axis L, the surface roughness of the outer peripheral surface may be the same as that of the first region A. According to the above-described configuration, the outer surface of the body 11 has a small degree of unevenness, is smooth, and has a good appearance.

First Variation

Figure 6:
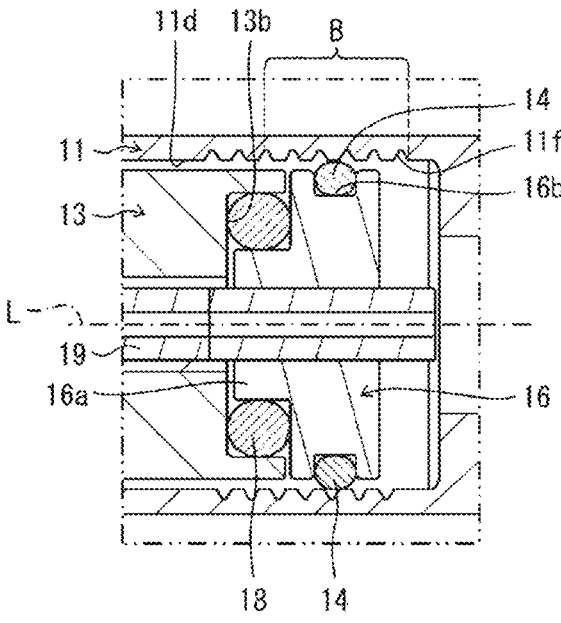
FIG. 6 is an enlarged view of a second end surface side of a holder according to a first variation.

FIG. 6 is an enlarged view of the second end surface side of the body 11 of the holder 1 according to a first variation. In the second region B of the large-diameter portion 11d of the body 11 of the first variation, a spiral-shaped groove 11f extending along the center axis line L is formed. According to the above-described configuration, the first elastic member 14 is locked to the unevenness generated by the spiral-shaped groove 11f of the second region B, and the position of the first elastic member 14 is less likely to be shifted in the second region B.

The depth of the groove 11f may be smaller than the dimension of the first elastic member 14 in a direction orthogonal to the center axis L in a cross section taken along the center axis L. When the depth of the groove 11f is larger than the dimension in a direction orthogonal to the center axis L, the first elastic member 14 may enter the groove 11f and the weight 13 may come into contact with the inner peripheral surface of the large-diameter portion 11d. When the weight 13 comes into contact with the inner peripheral surface of the large-diameter portion 11d, the vibration damping effect of the weight 13 absorbing the vibration of the holder 1 is reduced. According to the above-described configuration, since the depth of the groove is smaller than the dimension in the direction orthogonal to the center axis L, the weight 13 is less likely to come into contact with the inner peripheral surface of the large-diameter portion 11d.

Second Variation

Figure 7:
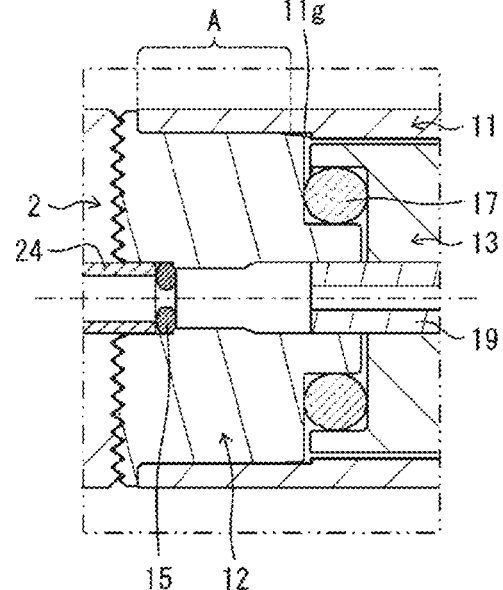
FIG. 7 is an enlarged view of a first end surface side of a holder according to a second variation.

FIG. 7 is an enlarged view of the distal end side of the holder 1 in a second variation. As can be seen from a comparison with FIG. 4, the inner diameter of the large-diameter portion 11d in the first region A is larger than the inner diameter of the large-diameter portion 11d in the second region B (see FIG. 5). That is, the inner peripheral surface of the large-diameter portion 11d includes a step 11g between the first region A and the second region B. According to the above-described configuration, the inner diameter of the large-diameter portion 11d in the second region B is smaller than the inner diameter of the large-diameter portion 11d in the first region A, whereby a swing width of the weight 13 becomes small, and the movement of the weight 13 is further reduced. The step 11g reduces the movement of the lid 12 in the X-axis direction when the lid 12 is press-fitted into the large-diameter portion 11d.

Head

As illustrated in FIGS. 1 to 3, the head 2 includes an attachment portion 21 having a substantially columnar shape and a mounting portion 22 having a polyhedral shape and provided so as to protrude from a distal end surface of the attachment portion 21 in the X-axis direction. The attachment portion 21 is mounted on a distal end portion of the holder 1 in a state where the axis thereof is aligned with the center axis L of the holder 1. An end surface of the attachment portion 21 on the holder 1 side is provided with a serration. The serration provided on the attachment portion 21 is fitted to the serration formed on the end surface on the distal end side of the lid 12 described above. In a state where these serrations are fitted to each other, the head 2 is mounted to the holder 1 using a screw (not illustrated) or the like.

An ejection portion 23 that includes an opening portion and that ejects coolant from the opening portion is provided on a distal end surface of the attachment portion 21. A protruding portion 24 is provided in a center portion of an end surface on the rear end side of the attachment portion 21 in a state of protruding toward the lid 12. A distal end portion of the protruding portion 24 and the ejection portion 23 are connected to each other (not illustrated). As described above, an internal space of the protruding portion 24 communicates with an internal space of the flow pipe 19 via the first hole 12c of the lid 12. The coolant injected into the small-diameter portion 11e flows through the protruding portion 24 via the flow pipe 19, and is ejected from the ejection portion 23 toward the workpiece during machining.

A pocket 22a is provided at one end portion in the Y-axis direction when the mounting portion 22 is seen in a plan view from the Z-axis direction. The pocket 22a includes a seat surface (not illustrated) on which the bottom surface of the insert 3 is placed, and a restraint side surface with which two side surfaces of the insert 3 come into contact and are restrained. The shape of the insert 3 is not limited to a specific configuration. For example, the insert 3 may have a rod shape, a polygonal plate shape, or a polygonal column shape. In the present embodiment, the insert 3 has a rhombic plate shape as illustrated in FIG. 1.

One corner of the rhombic shape of the insert 3 is notched to form a cutting edge 3a. Examples of a material of the insert 3 include cemented carbide alloy and cermet. The cemented carbide alloy and the cermet as the material of the insert 3 may have the same composition as the cemented carbide alloy and the cermet as the material of the weight 13. A through hole is provided in the center portion of the insert 3, and the insert 3 is fixed to the pocket 22a by placing the rhombic bottom surface on the seat surface, inserting a screw into the through hole, and screwing the screw to the seat surface.

Method for Manufacturing a Machined Product

Figure 8:
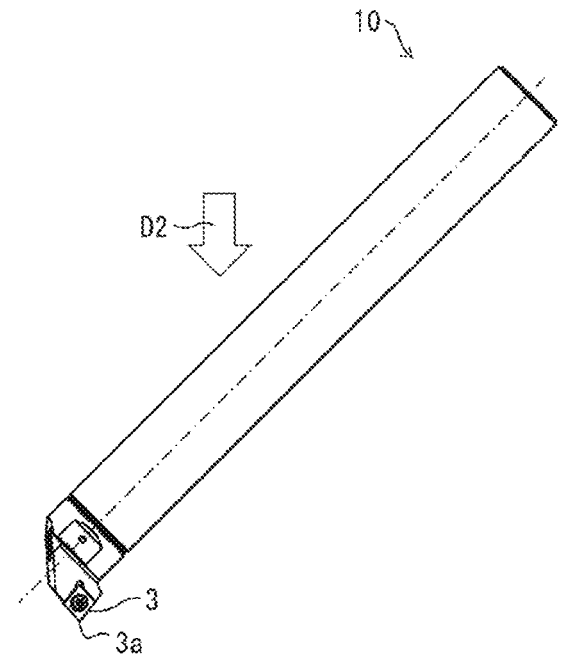
FIG. 8 is a schematic diagram illustrating a process of a method for manufacturing a machined product of a non-limiting example.
Figure 8:
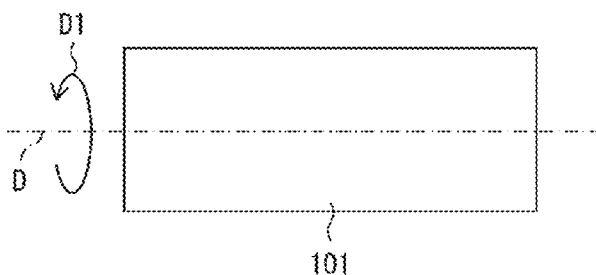
Figure 9:
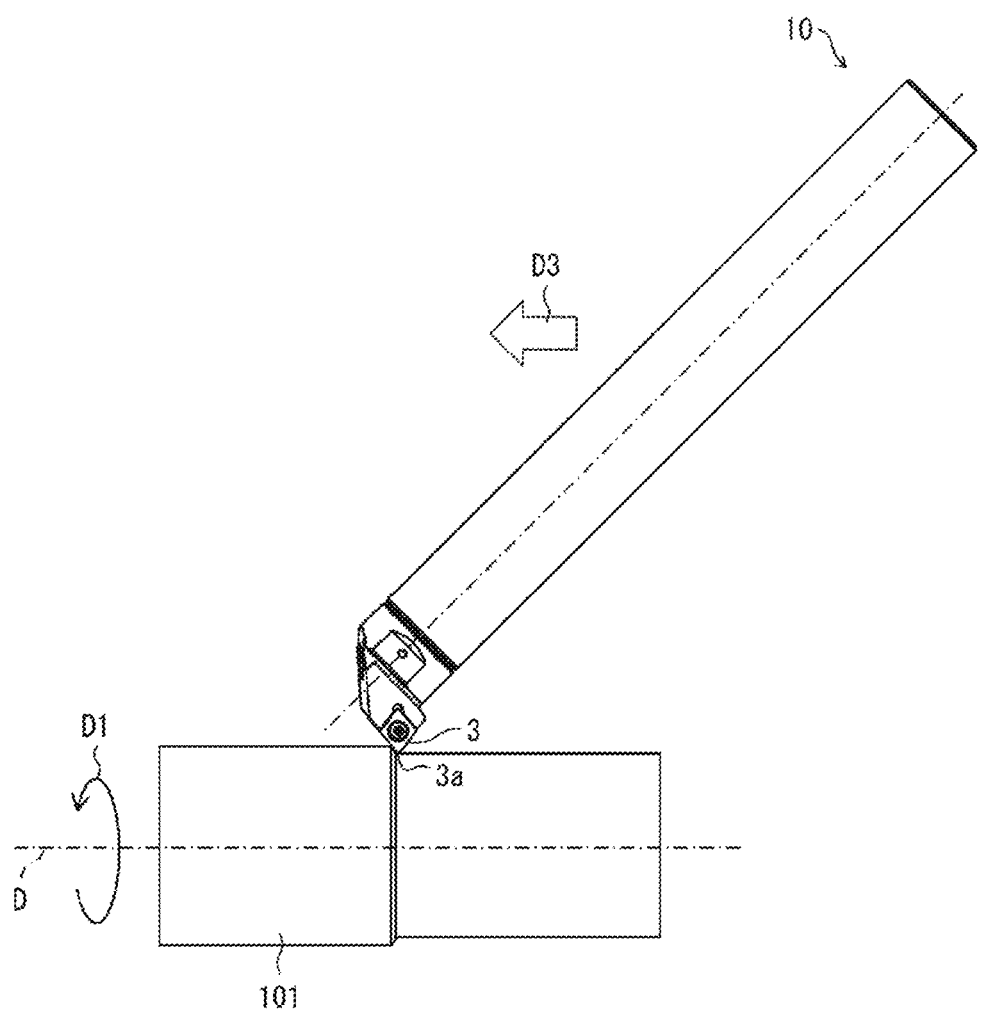
FIG. 9 is a schematic diagram illustrating a process of the method for manufacturing a machined product of the non-limiting example.
Figure 10:
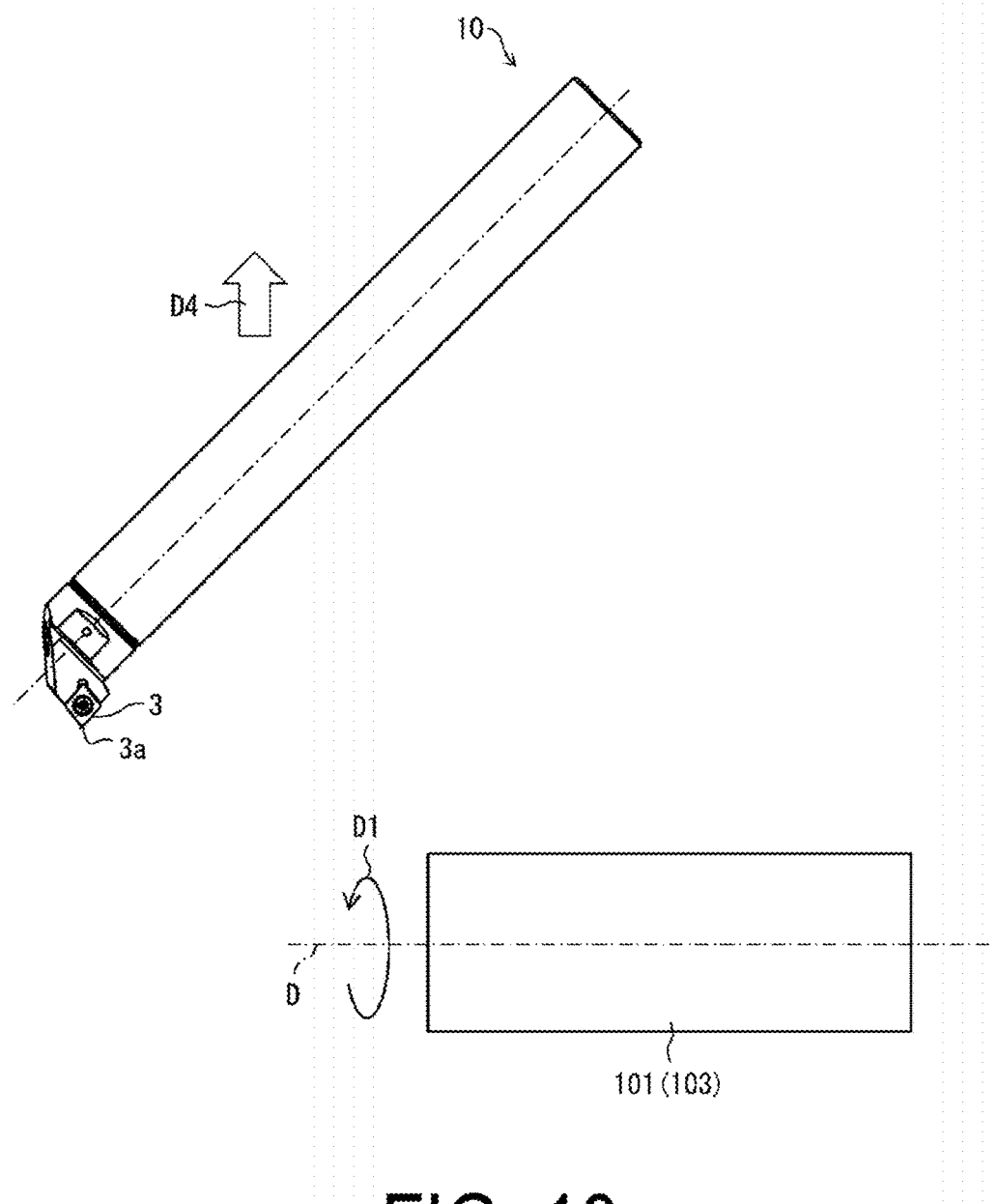
FIG. 10 is a schematic diagram illustrating a process of the method for manufacturing a machined product of the non-limiting example.

Next, description will be given of a method for manufacturing a machined product according to an embodiment. FIG. 8 is a schematic diagram illustrating a process of the method for manufacturing a machined product 103 of a non-limiting example. FIG. 9 is a schematic diagram illustrating a process of the method for manufacturing the machined product 103 of a non-limiting example. FIG. 10 is a schematic diagram illustrating a process of the method for manufacturing the machined product 103 of a non-limiting example.

The machined product 103 is manufactured by machining a workpiece 101. In the embodiment, outer diameter machining is given as an example of the machining. The method for manufacturing the machined product 103 according to the embodiment includes the following steps. That is, the method includes:

(1) rotating the workpiece 101,
(2) bringing the cutting tool 10 represented in the embodiment described above into contact with the workpiece 101 that is rotating, and
(3) separating the cutting tool 10 from the workpiece 101.

More specifically, first, as illustrated in FIG. 8, the workpiece 101 is rotated in a direction D1 about an axis D. The cutting tool 10 is brought relatively close to the workpiece 101 by moving the cutting tool 10 in a D2 direction. Then, as illustrated in FIG. 9, the cutting edge 3a of the cutting tool 10 is brought into contact with the workpiece 101 to cut the workpiece 101.

At this time, the workpiece 101 is cut with the cutting tool 10 being moved in a direction D3, whereby the external turning can be performed. Then, as illustrated in FIG. 10, the cutting tool 10 is relatively moved away from the workpiece 101 by moving the cutting tool 10 in a direction D4.

In FIG. 8, the cutting tool 10 is brought close to the workpiece 101 in a state where the axis D is fixed and the workpiece 101 is rotated. In FIG. 9, the workpiece 101 is cut by bringing the cutting edge 3a of the insert 3 into contact with the workpiece 101 that is rotating. In FIG. 10, the cutting tool 10 is moved away from the workpiece 101 that is rotating.

As described above, in the present embodiment, the position shift of the weight 13 is reduced, whereby the vibration of the body 11 in the radial direction is satisfactorily absorbed by the weight 13, and the vibration of the body 11 is effectively reduced.

In the machining in the manufacturing method of the embodiment, the cutting tool 10 is brought into contact with the workpiece 101 by moving the cutting tool 10. The cutting tool 10 is separated from the workpiece 101 by moving the cutting tool 10. However, the manufacturing method of the embodiment is not limited to such a configuration.

For example, in process (1), the workpiece 101 may be brought close to the cutting tool 10. In process (3), the workpiece 101 may be moved away from the cutting tool 10. When machining is to be continued, processes of bringing the insert 3 into contact with different locations on the workpiece 101 may be repeated while maintaining the cutting tool 10 in a rotated state.

Here, representative examples of the material of the workpiece 101 include carbon steel, alloy steel, stainless steel, cast iron, and non-ferrous metals.

In the present disclosure, the invention has been described above based on the various drawings and embodiments. However, the invention according to the present disclosure is not limited to each embodiment described above. That is, the embodiments of the invention according to the present disclosure can be modified in various ways within the scope illustrated in the present disclosure, and embodiments obtained by appropriately combining the technical means disclosed in different embodiments are also included in the technical scope of the invention according to the present disclosure.

In other words, a person skilled in the art can easily make various variations or modifications based on the present disclosure. Note that these variations or modifications are included within the scope of the present disclosure. For example, although the holder 1 of the cutting tool 10 has a round bar shape in the above-described embodiment, the holder 1 may have a square bar shape.

The invention claimed is:

1. A cutting tool holder configured to receive a cutting insert, wherein the cutting tool holder comprising:
a body having a bar shape extending along a center axis from a first end surface to a second end surface, the body comprising a recess extending from the first end surface toward the second end surface;

a weight located in the recess;
an elastic member having a ring shape in contact with an inner peripheral surface of the recess; and
a lid press-fitted into the recess from a side of the first end surface, wherein
the inner peripheral surface of the recess comprises
a first region located on a side of the first end surface and being in contact with the lid; and
a second region located closer to the second end surface than the first region and being in contact with the elastic member,
the weight is fixed to the inner peripheral surface by the elastic member, and
a surface roughness of the second region is greater than a surface roughness of the first region.
2. The cutting tool holder according to claim 1, wherein the lid comprises an outer peripheral surface configured to come into contact with the first region, and
a surface roughness of the outer peripheral surface is the same as the surface roughness of the first region.
3. The cutting tool holder according to claim 1, wherein the body further comprises an outer surface, and
a surface roughness of the outer surface is equal to or less than the surface roughness of the first region.
4. The cutting tool holder according to claim 1, wherein the second region comprises a groove having a spiral shape extending along the center axis.
5. The cutting tool holder according to claim 4, wherein a depth of the groove is smaller than a dimension of the elastic member in a direction orthogonal to the center axis in a cross section along the center axis.
6. The cutting tool holder according to claim 1, wherein an inner diameter of the recess in the second region is smaller than an inner diameter of the recess in the first region, and wherein
the recess further comprises a step located between the first region and the second region.
7. A cutting tool comprising:
the cutting tool holder according to claim 1; and
a cutting insert located on a side of the first end surface in the holder.
8. A method for manufacturing a machined product, the method comprising:
rotating a workpiece;
bringing a cutting tool into contact with the workpiece that is rotating, wherein the cutting tool comprises a cutting tool holder and a cutting insert, and the cutting tool holder comprises:
a body having a bar shape extending along a center axis from a first end surface to a second end surface, the body comprising a recess extending from the first end surface toward the second end surface;
a weight located in the recess;
an elastic member having a ring shape in contact with an inner peripheral surface of the recess; and
a lid press-fitted into the recess from a side of the first end surface, wherein
the inner peripheral surface of the recess comprises
a first region located on a side of the first end surface and being in contact with the lid; and
a second region located closer to the second end surface than the first region and being in contact with the elastic member,
the weight is fixed to the inner peripheral surface by the elastic member and
a surface roughness of the second region is greater than a surface roughness of the first region; and
separating the cutting tool from the workpiece.

* * * * *